United States Patent [19]

Ross

[11] 4,008,386
[45] Feb. 15, 1977

[54] METHOD AND MEANS FOR PRODUCING A CONTROL SIGNAL FOR PROCESS CONTROL INCLUDING REMOVABLE MEANS FOR INCREASING GAIN AS A TIME INTEGRAL OF ERROR

[75] Inventor: Charles Warren Ross, Hatboro, Pa.

[73] Assignee: Leeds & Northrup Company, North Wales, Pa.

[22] Filed: Jan. 13, 1976

[21] Appl. No.: 648,708

[52] U.S. Cl. .......................... 235/150.1; 318/610; 235/151.21
[51] Int. Cl.² ..................................... G05B 11/40
[58] Field of Search ............... 235/150.1; 318/609, 318/610

[56] References Cited
UNITED STATES PATENTS 3,819,999  6/1974  Platt ................................ 318/609
3,939,328  2/1976  Davis ............................. 235/150.1

FOREIGN PATENTS OR APPLICATIONS 1,306,067  2/1973  United Kingdom ............... 318/609

*Primary Examiner*—Eugene G. Botz
*Attorney, Agent, or Firm*—William G. Miller, Jr.; Raymond F. MacKay

[57] ABSTRACT

A removable control signal is provided which varies as the product of a gain constant times the control error and has means for increasing the gain constant as a time integral of the error. The integral is reset to zero, thus making the gain constant zero, when the error crosses zero to avoid an excessive build-up of the value of the control signal as when the error fails to promptly correct itself.

19 Claims, 4 Drawing Figures

METHOD AND MEANS FOR PRODUCING A CONTROL SIGNAL FOR PROCESS CONTROL INCLUDING REMOVABLE MEANS FOR INCREASING GAIN AS A TIME INTEGRAL OF ERROR

BACKGROUND OF THE INVENTION

This invention relates to a method and means for producing a control signal for the automatic control of a process and more particularly to a method and means for producing a control signal which is removed without creating a bump in the process at a time when the control error becomes zero.

The control action which results from use of the control signal produced by this invention has some of the characteristics of proportional control action in that the control signal is normally zero when the control error is zero. However, the resulting control action also has some of the attributes of reset action in that the control signal continually increases in response to the time integral of the control error. Thus, the control signal described can be utilized in conjunction with a standard proportional control signal where the proportional control signal is added to the control signal produced by the present invention to provide a substantial equivalent to a proportional plus integral control signal with a removable integral signal.

In some industrial processes using the standard proportional plus reset control the problem of reset windup in the process control is a serious problem which has received considerable attention in the past. Various arrangements have been provided by prior art process control systems for providing reset action which is removable at an appropriate time. However, in those prior art devices the removal of the reset in itself usually caused a bump in the process by producing in the control signal a step change at the time the reset action was removed.

One process which can advantageously utilize the present invention is the cement making process which involves a cement kiln. More specifically, the temperature control of certain portions of the cememt kiln which involve a reaction which is normally exothermic are complicated by characteristics of the kiln process which cause the process to lose its exothermic nature under certain conditions. It will be evident that when the process is no longer exothermic in the area in which the temperature is being controlled the effect of a normal proportional and reset controller would be to wind up considerably the magnitude of the reset response being provided in an attempt by the control to bring the process back to its control point. It will be evident, of course, that when the process again becomes exothermic the reset action which has been accumulated is no longer needed and if not removed will tend to produce overshoot in the temperature of the process as it returns to its control point. In such a situation it is obviously desirable to remove any integral or reset type action which has accumulated in the controller at the time of the process variable under control reaches its set point and it is further desirable that such a removal of the accumulated reset is preferably accomplished without creating a bump in the process. Thus, it is desirable to remove the accumulated integral action without a step change in the process control signal.

Still another process which can advantageously utilize the present invention is the process of controlling the generation of electricity at central stations, particularly in those stations where it is arranged that the control of generation is divided among several generators some of which are assigned the duty of responding to the swings in the required generation while others are assigned the task of dividing the total generation amongst them in such a way as to provide maximum economy in the production of energy from the station. Thus, the economical distribution when made includes all of the output of the stations including any which was initially picked up by the regulating units responding to the fast changes. In such a control system it is desirable that the generation initially picked up by the regulating units should be redistributed amongst the units assigned to provide the economic production of energy without the need for producing a control error in an opposite direction from the one which was corrected by the regulating units in order to remove from the regulating units and assign to the economic units the sustained load which must be carried by the station.

SUMMARY OF THE INVENTION

This invention relates to the method and means for automatically producing a control signal useful for controlling a process to minimize the control error calculated as the deviation of the process variable from its desired set point. The steps which are carried out by the elements of the invention include the production of a control signal which varies in accordance with the product of a gain factor and the control error. The gain factor is changed in accordance with the integral of said control error and the gain factor is reset to zero whenever the magnitude of the control error goes through zero. In response to the resulting control signal a condition of the process is varied to change the process variable toward its desired set point value.

DESCRIPTION OF THE PREFERRED EMBODIMENTS

Figure 1:
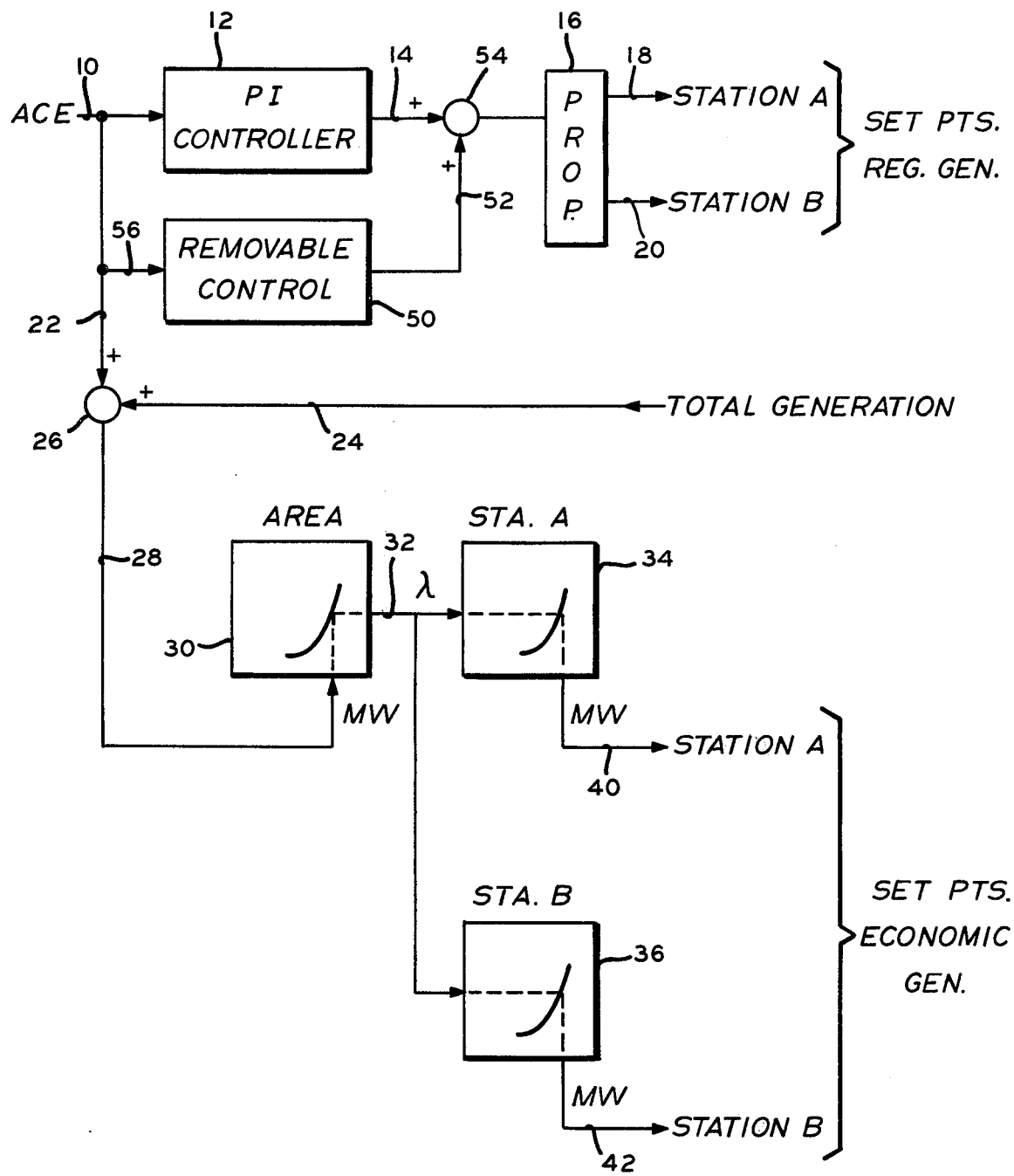
FIG. 1 is a block diagram of an automatic generation control system of the type which can advantageously utilize the present invention.

In FIG. 1 there is shown in block diagram form a control system which has been proposed for the control of generation in the several stations of a generating area with an indication of the manner in which the present invention may be incorporated into the control system to provide improved control without the introduction of any bumps in the control action. In the control system as proposed the area control error (ACE) which is introduced on line 10 to represent the deviation of the generation of the particular area from the required generation of that area needed to maintain any scheduled tie line interchanges with other areas while at the same time maintaining a desired frequency for the output of the system. The area control error is introduced as an input into the proportional and integral controller 12, which controller may be any of a number of standard controllers which incorporate both proportional and integral response, the term "integral response" being synonymous with reset action. The output of the controller 12 will then normally be supplied over line 14 to a proportioning device 16 which would apportion the response to the controller between the regulating units of stations A and B which make up the area. These signals would be provided on lines 18 and 20, respectively, and would be utilized at the particular stations as control signals for the particular generating units of those stations which have been assigned the task of regulating in response to the typical frequent swings in the area control error which occur in power systems in order to regulate for the load changes on the system. Those load changes at times occur more rapidly than can advantageously be compensated for by the most economic generating units in the particular station involved, thus the regulating generators of stations A and B would generally be those generating units which are capable of rapidly changing their output from a base load value, for example. The other generators of the stations would normally be assigned to generate at a level which provides the most economic output of the required power to reduce the area control error to zero.

Control of the economic generating units is accomplished by summing the area control error on line 22 with the measured total generation of the stations A and B which appears on line 24 and is made up of the sum of the outputs of all of the generators in the area which in this case may be assumed to include only stations A and B. Summation of the signals on lines 22 and 24 by the summer 26 then produces on line 28 a signal indicative of the total output required of the area in order to reduce the area control error to zero. That signal may be in terms of megawatts, for example, and as in FIG. 1 supplied to a function generator 30 which serves to provide an output signal λ on line 32 indicative of the incremental cost of generation for the particular input signal from line 28 representing the megawatt level desired as an output for the area. The signal from line 32 is then supplied to the function generator 34 and to the function generator 36 which respectively represent the characteristics of station A and station B of the area.

Thus, for a particular input value λ into the function generator 34 there is a particular output signal on line 40 provided by the function generator 34 which represents the megawatt generation required of station A for providing energy at the incremental cost level represented by λ. As is well known, the most economic division of generation amongst several stations or several generators is that which causes them to put out energy at a level which has a common incremental cost and therefore the signal from line 32 is also provided as an input to the function generator 36 for station B which then is controlled to generate at a level corresponding to the particular value of λ represented.

It will be evident that any reset or integral control action on the regulating units of stations A and B as provided through the signals on lines 18 and 20 can maintain the regulating units of those stations at a level other than zero when the area control error is zero. Obviously, it is desirable that whenever the control error is zero that all of the generation should be economically divided between the economic generators through the signals on lines 40 and 42, however, that cannot be the case until the regulating units of stations A and B have had their regulating outputs reduced to zero or in other words until those regulating units have been returned to their base load values.

In order to accomplish such a return an area control error of sign opposite that which was previously corrected would have to appear on line 10 causing the controller 12 to change the generation of the regulating stations A and B toward their base load values while at the same time making a compensatory change in the output of the economic generators controlled by the signals on lines 40 and 42. Since such a requirement is undesirable it is advantageous to maintain the system at its present condition whenever the control error is zero it can be seen that it is desirable to introduce a control action of the type described in this invention. This control action is introduced by way of the removable control provided by the controller 50 which provides an output on line 52 to the adder 54 where the signal on line 52 is summed with the signal from line 14.

The controller 50 receives as its input on line 56 a signal representing the area control error from line 10. The controller 50 may be in any one of a number of forms which will be described below in connection with FIGS. 2 and 3. Such a control may be provided in combination with the PI controller 12 or, if desired, the integral (reset) portion of the controller 12 may be omitted and the control provided by the controller 50 may be combined with a proportional control only from controller 12 in which case it will be evident that if the signal on line 52 can be returned to zero whenever the area control error is zero then there will be no remaining regulating generation assigned to stations A and B when the area control error is zero and all of the generation will be assigned to the economic units as is desired without a bump.

Figure 2:
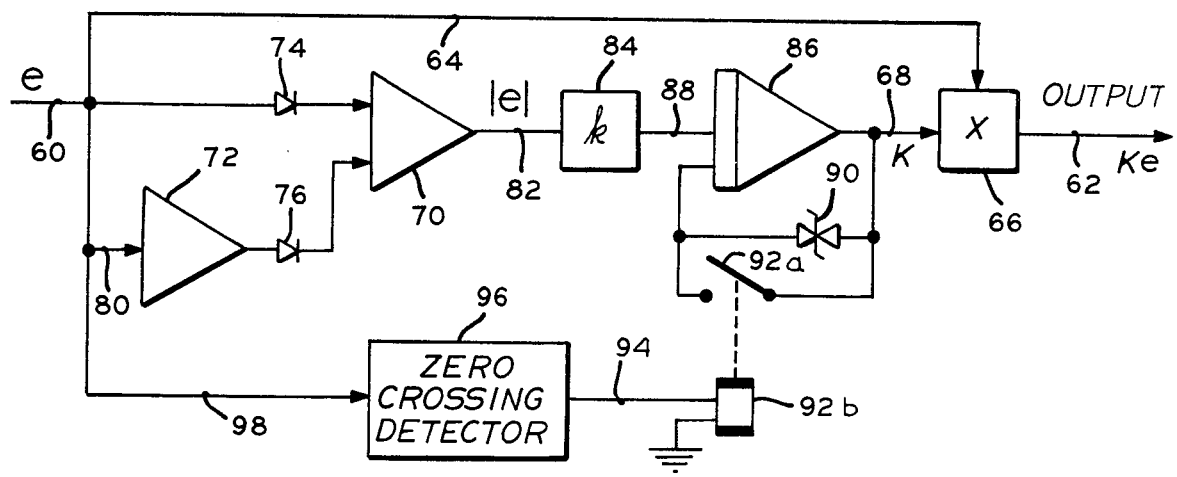
FIG. 2 is a circuit diagram in block form showing the invention in one form.

One form which the controller 50 of FIG. 1 may take is that shown in FIG. 2 where the error signal on line 60 corresponds to the area control error signal on line 10 of FIG. 1 and the output signal on line 62 corresponds to the output signal on line 52 of FIG. 1. In providing the output signal 62, which may be described as a control signal, there is provided a connection over line 64 between lines 60 and the multiplier 66 so that one of the inputs to the multiplier is the error signal $e$. Thus it may be said that the control signal on line 62, $Ke$, varies in proportion to the product of a gain factor K as represented by the signal on line 68 and the control error as represented by the signal on line 64.

In producing the signal on line 68 which determines the gain factor there is utilized an absolute value circuit made up of operational amplifiers 70 and 72 wherein the amplifier 70 has one of its inputs provided through a diode 74 so that positive error signals only are received by the amplifier 70 at that particular input whereas the output of amplifier 72 is through the diode 76 so that only positive output signals from amplifier 72 are provided at the other input to amplifier 70. The output signal from amplifier 72 is positive, of course, only when the input signal on line 80 representing the error $e$ is negative since the amplifiers 70 and 72 are of sign inverting. The output from amplifier 70 on line 82 is then representative of the error $e$ and is not variable in sign as the error $e$ varies in sign.

The signal on line 82 is multiplied by a constant k in the multiplier 84 to produce an input to the integrating amplifier 86 over line 88 so that the integrating amplifier 86 serves to integrate the input from line 88 to provide the constant K on the output line 68. The integrating amplifier 86 is provided with a limiting circuit consisting of the zener diode 90 in its feedback circuit. That zener diode 90 is shunted by circuits including the relay contact 92a which is operated by the relay coil 92b whenever the relay coil 92b is energized by a signal on line 94.

The closing of the relay contact 92b, of course, serves to reset the integrator 86 so that the output from the integrator is zero on line 68.

The signal on line 94 is provided as an output from a zero crossing detector 96 whose input signal from line 98 represents the error $e$ so that whenever the error $e$ crosses zero a signal is applied to line 94 to energize the relay operator 92b. It will thus be evident that with the control circuit of FIG. 2 whenever the error signal on line 60 is zero the output signal K$e$ on line 62 is zero and as the error signal increases in either a positive or negative direction the output of the integrator 86 integrates the deviation of the error signal from zero at a rate determined by the constant $k$ to increase the gain factor K with the gain factor increasing all of the time that the error signal is away from zero. Thus, the multiplier 66 multiplies the gain factor by the error giving the output signal K$e$ as a control signal normally operative on the process to which the controller is connected to vary the manipulated variable of the process accordingly. The control signal on line 62, however, as was pointed out previously, will be returned to zero whenever the error signal on line 60 returns to zero thus avoiding any type of wind-up as a result of the duration of the deviation of the error signal from zero such as is usually experienced with reset as found in the normal controller.

It will be noted that when the control action resulting from the output of the integrator 86 in FIG. 2 is returned to zero it is returned to zero without any step change in the control signal on line 62 since regardless of the value of the gain factor K that factor is returned to zero only when the other input to the multiplier 66 is zero and hence at that time the signal on line 62 out of the multiplier must necessarily be zero.

Figure 3:
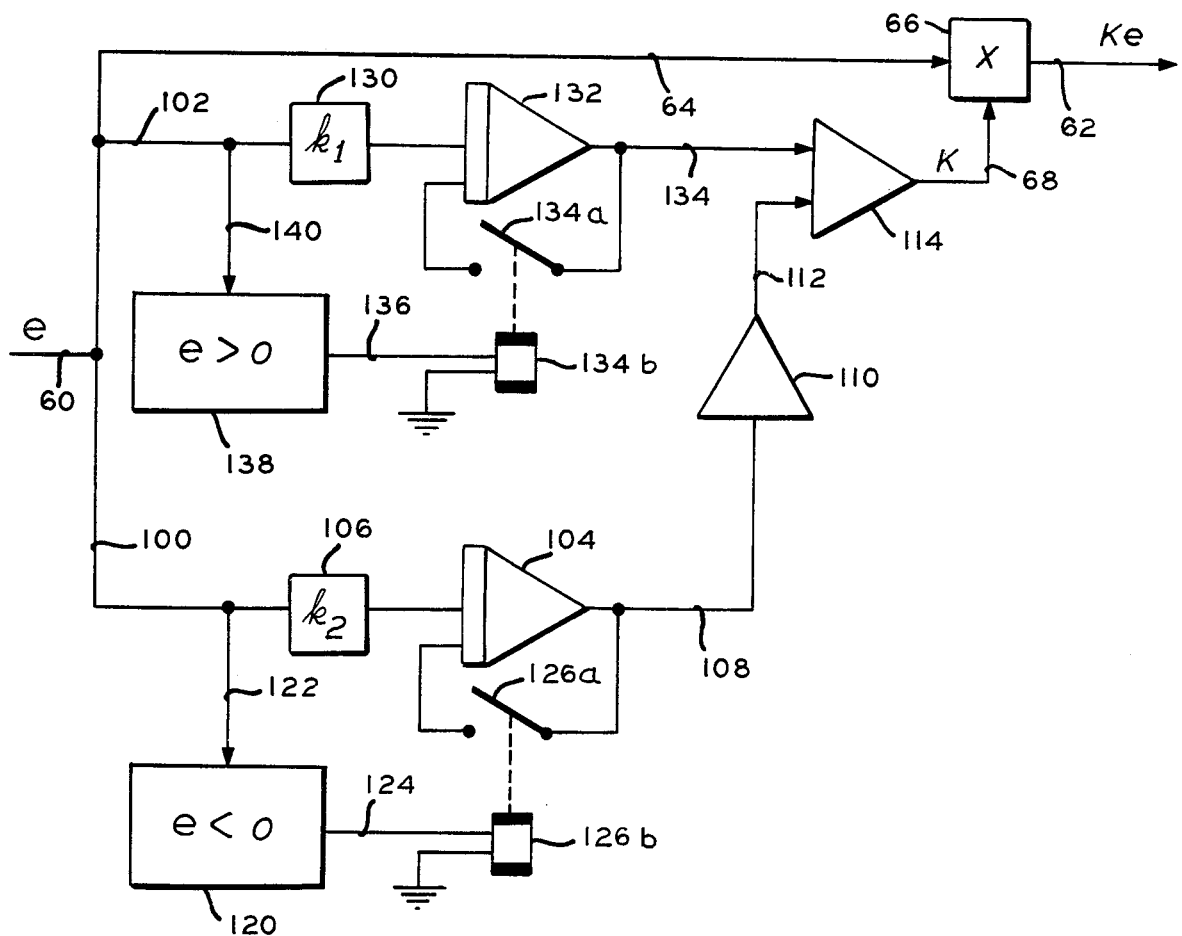
FIG. 3 is a circuit diagram in block form showing an alternate form of the invention.

In FIG. 3 there is provided a control circuit similar to that of FIG. 2 except that provision is made for integrating at a different rate depending upon the polarity of the error signal on line 60. Thus, the branch of the circuit which includes line 100 is operative when the error signal is positive whereas the branch of the circuit including line 102 is operative when the error signal is negative. As in FIG. 2, the error signal from line 60 is supplied by way of line 64 to the multiplier 66 as one input whereas another input representative of the gain factor K is supplied on line 68 to the multiplier 66 whose output on line 62 is the control signal K$e$. When the error signal is positive the integrator 104 integrates the signal from line 100 after it has been multiplied by the constant $K_2$ in multiplier 106 and provides an output signal on line 108 to sign inverting amplifier 110. The output of the sign inverting amplifier 110 on line 112 provides one input to the amplifier 114. Whenever the error signal is less than zero the detector 120 is operable to respond to the error signal provided over line 122 to produce on its output line 124 a signal to the relay operator 126b which is effective to pull in the relay contact 126a. The contact 126a shorts out the integrating capacitor (not shown) in amplifier 104 and thus resets the integrator 104 so that the signal on line 108 is returned to zero.

In similar fashion when the error signal is negative the error signal multiplied by the constant $k_1$ in multiplier 130 provides an input to the integrating amplifier 132 which is effective to provide an output on line 134 which is the integral of the value $k_1e$. Line 134 is another input line to amplifier 114 and will carry a signal with the same polarity as the other input line 112. The integrator 132 is reset by closure of the relay contact 134a upon energization of the relay coil 134b from a signal on line 136 from the detector 138 in response to an input on line 140 indicating that the error signal has exceeded zero.

It will be evident from the above description that the circuit of FIG. 3 provides a control signal on line 62 in response to the error signal on line 60 similar to that provided in FIG. 2 with the exception that provision is made for different rates of integration depending upon the polarity of the error signal by virtue of the incorporation of the integrators 104 and 132 and the separate constants $k_1$ and $k_2$ of the multipliers 106 and 130.

The circuit of FIG. 3 can be utilized in such a way that the detectors respond to the error signal crossing a predetermined value other than zero as a means for initiating operation of the integrators to provide for an integrating rate of different magnitude for the different polarities of the error signal with the integrators being reset when the error crosses zero. Such a circuit is shown in FIG. 4 which, in addition, adds to the control signal a supplementary control signal which incorporates both proportional and reset with the reset rate being varied between two values depending upon whether or not the error signal is within a band established by predetermined values of opposite sign.

Figure 4:
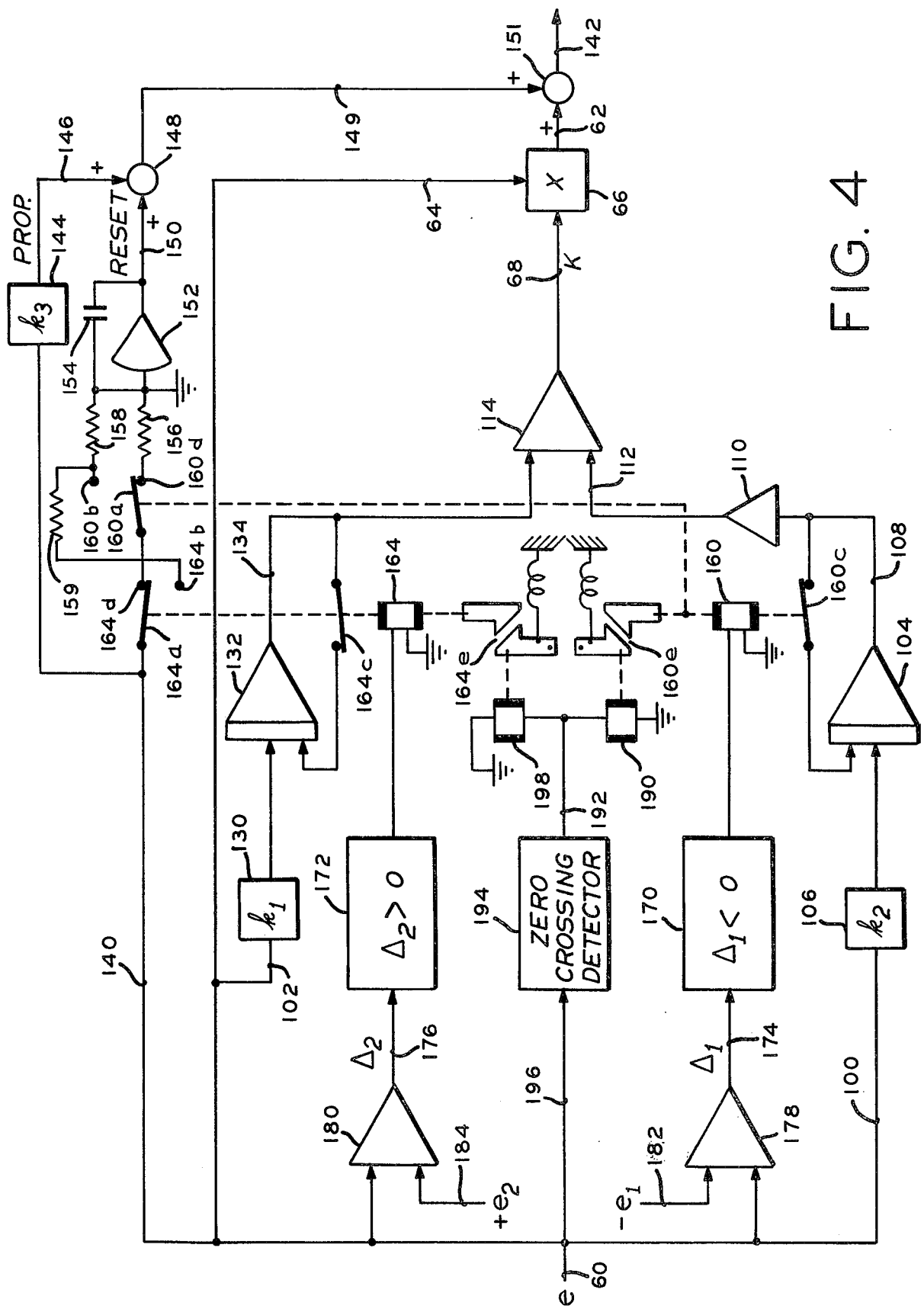
FIG. 4 is a circuit diagram in block form showing the combination of the invention with a proportional and integral controller.

In the system of FIG. 4, whenever the error $e$ appearing on line 60 is between two predetermined values such as $+e_1$ and $-e_2$ the error signal is effective by way of its connection through line 140 to provide a proportional and reset control action in the production of the total control signal on line 142. The proportional action is provided by multiplying the signal on line 140 by a constant $k_3$ in the multiplier 144 whose output on line 146 provides one input to the summer 148. The other input to the summer 148 on line 150 provides the reset action and is generated by an integrating amplifier comprised of the high gain amplifier 152 with its feedback capacitor 154 and the selectable input resistors 156 and 158.

As long as the error signal on line 60 is between the predetermined values $+e_1$ and $-e_2$ the relay contacts 160a and 164a are all in their normally closed positions with 160a contacting 160d and 164a contacting 164d so that the effective input resistor in the integrating circuit including amplifier 152 is the resistor 156 which provides a particular integration rate which is greater than that which will be provided whenever the effective input resistor is resistor 158. Thus, with resistor 156 providing the input to amplifier 152 the reset rate is the normal rate required for proper control of the process involved.

It is sometimes desirable that the introduction of a removable control signal on line 62 be accompanied by a change in the reset rate as by the actuation of either the relay contact 160a into contact with the contact 160b to connect resistor 158 as the effective input resistor or the actuation of relay contact 164a into contact with the contact 164b, to connect the series combination of resistors 158 and 159 as the effective input resistors. Thus there can be provided different reset rates depending on the polarity of the error $e$. Of course, resistor 159 can be omitted if different reset rates are not desired. It will also be evident that the resistors 158 and 159 can both be omitted and replaced by an open circuit when it is desired to maintain the signal on line 150 constant whenever the gain factor K is subject to change.

The circuit producing the signal on line 62 is similar to that of FIG. 3 except that the detectors 170 and 172 which are effective respectively to actuate with their output signals the relay actuators 160 and 164 are operative to produce output signals whenever their input signals are below zero, as in the case of detector 170, or above zero, as in the case of detector 172. However, those input signals which appear respectively on lines 174 and 176 as $\Delta_1$ and $\Delta_2$ are not equal to the error signal on line 60, as in FIG. 3, but are instead indicative of whether or not the error signal is beyond a particular predetermined value such as $+e_1$ and $-e_2$. For example, the signal $\Delta_1$ on line 174 is calculated in accordance with the following equation:

$$\Delta_1 = -(e - e_1)$$

This calculation is performed by the amplifier 178. Similarly the signal $\Delta_2$ which appears on line 176 is calculated by the amplifier 180 in accordance with the following equation:

$$\Delta_2 = -(e + e_2)$$

To make the appropriate calculations as set forth above in the equations for $\Delta_1$ and $\Delta_2$ it is necessary that the amplifier 178 have one input from the line 60 corresponding to the error signal and another input on line 182 corresponding to $-e_1$ whereas the amplifier 180 has as one of its inputs the error signal and as its other input on line 184 the signal $+e_2$.

If we assume that the error $e$ on line 60 is between $+e_1$ and $-e_2$ the only effective control is the proportional and reset control provided by the proportional gain factor $k_3$ and the integral or reset rate established by resistor 156 and amplifier 152 in conjunction with capacitor 154. That proportional and reset action which is summed in summer 148 and established as a first process control signal on line 149 is introduced as one input to the summer 151. The other input from line 62 is a second process control signal and will under the same conditions be zero so that the total control signal on line 142 would be equal to the control signal on line 149.

If, for example, the error signal $e$ exceeds the value $+e_1$ then the signal $\Delta_1$ on line 174 which provides an input to detector 170 will be less than zero so that an output signal will by the detector 170 as an energizing signal to relay actuator 160 which will be effective to open the relay contact 160c while the relay contact 160a is actuated to make contact with contact 160b so as to make the input resistor 158 effective in the establishing of the reset rate in the control signal on line 149.

The opening of relay contact 160c makes the integrator 104 effective to respond to its input signal from the output of the multiplier 106 which is connected by way of line 100 to receive an input from line 60 equal to the error $e$. The amplifier 104 then produces by way of its output on line 108 one of the input signals to amplifier 114 by way of sign changing amplifier 110 and line 112. That input produces the gain factor K on the output line 68 of amplifier 114. As in FIG. 3, the gain factor K is multiplied in multiplier 66 by the magnitude of the error signal which appears as the other input to the multiplier 66 on line 64.

It will be noted that relay 160 includes a latching mechanism 160e so that the relay once energized is maintained in that position until the latch is opened by the energization of relay 190. The relay 190 is energized upon the appearance of an output signal on line 192 of the zero crossing detector 194 whose input is by way of line 196 from the line 60 so that when the error signal on line 60 crosses zero an output signal appears on line 192 to open the latch 160e to cause a reclosure of the relay contact 160c along with a return of the contact 160a to its normal position, namely in contact with 160d to connect resistor 156 as the effective input resistor for amplifier 152. There is thus provided a removal of the signal from line 62 by the effective resetting of the integrator 104 which will result in the gain factor K going to zero.

When the error signal $e$ goes negative by an amount that exceeds the value $-e_2$ the signal $\Delta_2$ at line 176 will then exceed zero and the detector 172 will cause its output signal to energize the relay 164 to open contact 164c while at the same time moving the contact 164a from contact with 164c into contact with the contact 164b. Opening the contact 164c makes the integrator 132 effective in response to its input from the multiplier 130 as is described in FIG. 3. The closing of the contacts 164a and 164b reduces the reset rate effective in the signal on line 149 by making the input resistor 158 and 159 effective for amplifier 152. The relay 164 has a latching mechanism 164e similar to the latching mechanism for relay 160. That latching mechanism is effective to maintain the relay contacts in their energized position until the latch mechanism is opened by the energization of relay 198 in response to a signal on line 192 indicating that the error signal $e$ has crossed zero as detected by the crossing detector 194. Upon opening of the latch mechanism 164e the contacts 164a, and 164c return to their deenergized positions and the gain factor K is returned to zero by the effective resetting of integrator 132 and, of course, as a result the signal on line 62 returns to zero.

From the above description it will be evident that the control circuit of FIG. 4 is effective to provide proportional and reset action in the total control signal on line 142 whenever the error signal on line 60 is between the predetermined values $+e_1$ and $-e_2$ whereas when the error signal $e$ is beyond those predetermined values the reset rate established for the control is decreased and there is added to the first control signal on line 149 the second control signal on line 62 which is effectively equal to the gain factor K times the error signal $e$ with the gain factor K being established in a manner similar to that set forth in FIG. 3. However, in FIG. 4 the gain factor K is returned to zero only when the error crosses zero as detected by the detector 194 at which time the reset rate of the control signal on line 149 is reestablished at a higher value as determined by resistor 156.

It will be evident to those skilled in the art that controllers of the type described in FIGS. 2 and 3 can be combined with conventional control action including either proportional and/or proportional and reset control action in other ways as may be required by the circumstances of the process under control and only one combination has been shown in FIG. 4 as illustrative of a typical combination which can be made.

It will also be evident that the removable control signal will cause a control action in any process control system which is comparable to a proportional control in which the proportional band is gradually shrunk from an infinite width toward an infinitesimal width as long as a control error exists with the control action disappearing when the control error becomes zero.

What is claimed is:

1. The method for automatically producing a control signal for controlling a variable of a process to minimize a control error calculated as the deviation of the measured value of that process variable from its desired set point value comprising the steps of;

producing a signal which varies in accordance with the product of a gain factor and the control error, changing said gain factor in accordance with the integral of the magnitude by which the control error exceeds a predetermined value, and resetting said gain factor to zero whenever the magnitude of said control error goes through zero so that said signal acts as a control signal which goes to zero when said error goes through zero.

2. The method of claim 1 in which said gain factor is changed in accordance with one integral rate for control errors of one sign and in accordance with another integral rate for control errors of the opposite sign.

3. The method of claim 1 in which said predetermined value is zero.

4. The method of claim 1 in which said predetermined value is the same value for errors of opposite signs.

5. The method of claim 1 in which said predetermined value is a first value for errors of one sign and a second value for errors of the opposite sign.

6. The method of claim 1 which includes the step of adding to said control signal a supplementary signal varying in accordance with both the error and the integral of the error.

7. The method of claim 1 which includes the step of adding to said control signal a first supplementary signal varying in proportion to said error and a second supplementary signal varying in accordance with the integral of said error.

8. The method of claim 7 in which the second supplementary signal is maintained unchanged when said gain factor is subject to change.

9. The method for automatically controlling a process to minimize a control error calculated as the deviation of the measured value of a process variable from its desired set point value comprising the steps of;

producing a control signal which varies in proportion to the product of a gain factor and the magnitude by which said error exceeds a predetermined value, changing said gain factor in accordance with the integral of said magnitude, resetting said gain factor to zero whenever said error goes through zero, and varying a process condition to change said process variable toward its desired value in response to said control signal.

10. The method for automatically producing a total control signal useful for controlling a process to minimize a control error calculated as the deviation of a measured value of a process variable from its desired set point value comprising the steps of:

producing a first process control signal which varies in accordance with the sum of a proportional control signal and a reset control signal, said proportional control signal being of value determined as the product of the proportional gain and the value of said error and said reset control signal being of value determined as the time integral of the product of the error and a reset constant for establishing the reset rate, producing a second process control signal which varies in proportion to the product of another gain factor and the magnitude by which said error exceeds a predetermined value, changing said other gain factor in accordance with the integral of said magnitude, and changing said reset constant to reduce said reset rate when said error exceeds said predetermined value, resetting said other gain factor to zero and changing said reset rate back to its higher value whenever said error goes through zero, and adding said first and second process control signals to produce a total control signal.

11. Apparatus for producing a control signal for controlling a variable of a process to tend to minimize a control error calculated as the deviation of the measured value of that variable from a desired set point value comprising:

means for producing a first signal proportional to the error integrating means for producing a second signal proportional to the magnitude only of the time integral of the value by which the error exceeds a predetermined magnitude, means for producing the control signal in accordance with the product of the first and second signals, and means for resetting said integrating means when said deviation is zero to simultaneously cause said second signal to go to zero.

12. Apparatus as set forth in claim 11 in which the predetermined magnitude is zero.

13. Apparatus as set forth in claim 11 in which the integrating means includes means for integrating positive errors at one rate and negative errors at another rate.

14. Apparatus as set forth in claim 13 in which said integrating means includes:

a first integrator for said positive errors and a second integrator for said negative errors.

15. Apparatus as set forth in claim 14 in which said means for resetting said integrating means includes a first detector operative to reset said first integrator when the error becomes negative, and a second detector operative to reset said second integrator when the error becomes positive.

16. Apparatus as set forth in claim 13 in which said integrating means includes means for integrating at different rates depending upon the polarity of said error.

17. Apparatus as set forth in claim 11 which includes means for adding to said control signal a supplementary signal varying in proportion to the error.

18. Apparatus as set forth in claim 17 in which said supplementary signal varies in proportion to the error and the integral of the error.

19. Apparatus for automatically producing a total control signal useful for controlling a process to minimize a control error calculated as the deviation of a measured value of a process variable from its desired set point value comprising:

means for producing a first process control signal which varies in accordance with the sum of a proportional control signal and a reset control signal, said proportional control signal being of value determined as the product of the proportional gain and the value of said error and said reset control signal being of value determined as the time integral of the product of the error and a reset constant for establishing the reset rate, means for producing a second process control signal which varies in proportion to the product of another gain factor and the magnitude by which said error exceeds a predetermined value, means for changing said other gain factor in accordance with the integral of said magnitude, and changing said reset constant to reduce said reset rate when said error exceeds said predetermined value, means for resetting said other gain factor to zero and changing said reset rate back to its higher value whenever said error goes through zero, and means for adding said first and second process control signals to produce a total control signal.

* * * * *